US006170609B1

(12) United States Patent
Dech (10) Patent No.: US 6,170,609 B1
(45) Date of Patent: Jan. 9, 2001

(54) TREE DECH

(76) Inventor: Edwin F. Dech, 525 D School Rd., Nazareth, PA (US) 18064

( * ) Notice: Under 35 U.S.C. 154(b), the term of this patent shall be extended for 0 days.

(21) Appl. No.: 09/451,533

(22) Filed: Dec. 1, 1999

Related U.S. Application Data (63) Continuation-in-part of application No. 09/262,400, filed on Mar. 4, 1999, now abandoned.

(51) Int. Cl.$^7$ .................................................. A01M 31/00
(52) U.S. Cl. ........................... 182/187; 182/100; 182/189
(58) Field of Search ................... 182/100, 187, 182/116, 189

(56) References Cited

U.S. PATENT DOCUMENTS

| | | | |
|---|---|---|---|
| 1,528,268 | * | 3/1925 | Schlegel . |
| 4,069,892 | * | 1/1978 | Lynne .................................. 182/189 |
| 4,867,272 | * | 9/1989 | Troubridge ........................... 182/189 |
| 4,928,793 | * | 5/1990 | Westmayer . |
| 5,040,635 | * | 8/1991 | Strickland ............................ 182/189 |
| 5,655,623 | * | 8/1997 | Skyba ................................... 182/116 |

* cited by examiner

*Primary Examiner*—Alvin Chin-Shue (57) ABSTRACT

A system for sportsmen when hunting at an elevated location in a tree without harming the supporting tree including a base plates The base plate has an interior face positioned in contact with the exterior surface of a supporting tree and an exterior exposed face. The base plate has laterally spaced apertures adjacent to its edges. A threaded machine bolt has a diameter over the majority of its length and has an interior edge secured to the exterior surface of the base plate and an enlarged cylindrical exterior end. A coupling assembly is formed of two sections. Each section has an interior link permanently secured to an associated aperture in the base plate and has free ends. A locking assembly removably couples the base plate-coupling assembly to a tree. A support assembly has a downwardly extending auxiliary plate positionable over the base plate with an opening there through. The opening has an enlarged lower portion positionable over the head of the bolt and an upper portion of a reduced size for positioning over the central portion of the bolt.

10 Claims, 6 Drawing Sheets

TREE DECH

RELATED APPLICATIONS

This application is a continuation in part of application Ser. No. 09/262,400 filed Mar. 4, 1999, abnd.

BACKGROUND OF THE INVENTION

1. Field of the Invention

The present invention relates to a system for sportsmen when hunting at an elevated location in a tree without harming the supporting tree and more particularly pertains to hunting in an ecologically preferred manner.

2. Description of the Prior Art

The use of devices for use by sportsmen when hunting of known designs and configurations is known in the prior art. More specifically, devices for use by sportsmen when hunting of known designs and configurations heretofore devised and utilized for the purpose of maintaining ecological balance when hunting through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,731,956 to Hanley discloses a panel structure and the like with connecting means. U.S. Pat. No. 4,113,058 to Kobosh discloses a portable seat for hunters. U.S. Pat. No. 4,600,081 to Wade discloses a portable tree seat for hunters and outdoorsmen. U.S. Pat. No. 4,727,961 to Dawson discloses a hunting tree stand. U.S. Pat. No. 4,730,700 to Miller discloses a portable tree stand. U.S. Pat. No. 4,928,793 to Westimayer discloses a rigid tree seat. Lastly, U.S. Pat. No. 5,518,083 to Blennert discloses a swing arm tree stand.

While these devices fulfill their respective, particular objectives and requirements, the aforementioned patents do not describe a system for sportsmen when hunting at an elevated location in a tree without harming the supporting tree that allows hunting in an ecologically preferred manner.

In this respect, a system for sportsmen when hunting at an elevated location in a tree without harming the supporting tree according to the present invention substantially departs from the conventional concepts and designs of the prior art, and in doing so provides an apparatus primarily developed for the purpose of hunting in an ecologically preferred manner.

Therefore, it can be appreciated that there exists a continuing need for a new and improved system for sportsmen when hunting at an elevated location in a tree without harming the supporting tree which can be used for hunting in an ecologically preferred manner. In this regard, the present invention substantially fulfills this need.

SUMMARY OF THE INVENTION

In view of the foregoing disadvantages inherent in the known types of devices for use by sportsmen when hunting of known designs and configurations now present in the prior art, the present invention provides an improved system for sportsmen when hunting at an elevated location in a tree without harming the supporting tree. As such, the general purpose of the present invention, which will be described subsequently in greater detail, is to provide a new and improved system for sportsmen when hunting at an elevated location in a tree without harming the supporting tree and method which has all the advantages of the prior art and none of the disadvantages.

To attain this, the present invention essentially comprises a base plate. The base plate is formed in a partially cylindrical configuration. The base plate has an interior face adapted to be positioned in contact with the exterior surface of a supporting tree. The base plate has an exterior exposed face. The base plate also has laterally spaced apertures adjacent to its side edges. Next provided is a threaded machine bolt. The threaded machine bolt has a diameter over the majority of its central extent. The interior end of the threaded machine bolt is secured to the exterior surface of the base plate. The threaded machine bolt has an enlarged cylindrical exterior end. A chain is formed of sections. Each section has an interior link permanently secured to an associated aperture in the base plate. The chain has couplable free ends. A supplemental plate is positioned on the exterior surface of the tree circumferentially remote from the base plate. The supplemental plate has an upper first locking component. The upper first locking component is provided with a hole. The supplemental plate also has an upper second locking component. The upper second locking component is provided with a second hole. The first and second holes are alignable. A padlock is secured through the holes during operation and use. The supplemental plate, base plate and chains are adapted to be removably secured to an elevated location on a tree. Next provided is a bolt. The bolt has a C-shaped first end. The C-shaped first end of the bolt is removably attachable to a free end of a chain section. The bolt also has a threaded second end which is removably couplable to a bolt in the second locking component. A support assembly has a horizontal floor. The floor is provided with an aperture. The aperture supports a transverse pivot pin. Next provided is a seat for a user. The aperture extends along the length of the support assembly and the seat. The seat has a leg. The upper end of the leg is secured to the bottom of the seat. A lower end of the leg is provided with an oval aperture. The oval aperture is pivotably received on the pivot pin. In this manner movement of the seat between a lowered orientation for storage and transportation and an upper orientation for operation and use by a seated hunter is effected. The seat has an auxiliary plate. The auxiliary plate is positionable over the base plate with an opening there through. The opening has an enlarged lower portion. The enlarged lower portion is positionable over the head of the bolt. An upper portion is of a reduced size for positioning over the central portion of the bolt. Next provided is a ladder. The ladder is formed with at least one vertically extending bar. A plurality of horizontally extending climbing bars extend outwardly from the vertically extending bar. An upper plate is secured to the upper end of the vertically extending bar. An aperture is provided through the upper plate. The aperture has a lower circular portion. The lower circular portion is adapted to pass over the head of the bolt. A reduced lower portion of the aperture is adapted to be maintained on the central extent of the pin. Lastly provided is a supplemental ratchet strap. The strap is formed of two sections. The sections are secured at their interior ends to the lower portion of the vertical rod. The strap has free ends adapted to encompass the tree at a lower region. The free ends also function for removably coupling with lower locking components which may be similar to the upper locking components but is preferably a ratchet clamp.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for sportsmen when hunting at an elevated location in a tree without harming the supporting tree which has all of the advantages of the prior art devices for use by sportsmen when hunting of known designs and configurations and none of the disadvantages.

It is another object of the present invention to provide a new and improved system for sportsmen when hunting at an elevated location in a tree without harming the supporting tree which may be easily and efficiently manufactured and marketed.

It is a further object of the present invention to provide a new and improved system for sportsmen when hunting at an elevated location in a tree without harming the supporting tree which is of durable and reliable constructions.

An even further object of the present invention is to provide a new and improved system for sportsmen when hunting at an elevated location in a tree without harming the supporting tree which is susceptible of a low cost of manufacture with regard to both materials and labor, and which accordingly is then susceptible of low prices of sale to the consuming public, thereby making such a system for sportsmen when hunting at an elevated location in a tree without harming the supporting tree economically available to the buying public.

Even still another object of the present invention is to provide a system for sportsmen when hunting at an elevated location in a tree without harming the supporting tree for hunting in an ecologically preferred manner.

Lastly, it is an object of the present invention to provide a new and improved system for sportsmen when hunting at an elevated location in a tree without harming the supporting tree including a base plate. The base plate has an interior face positioned in contact with the exterior surface of a supporting tree and an exterior exposed face. The base plate has laterally spaced apertures adjacent to its edges. A threaded machine bolt has a diameter over the majority of its length and has an interior edge secured to the exterior surface of the base plate and an enlarged cylindrical exterior end. A coupling assembly is formed of two sections. Each section has an interior link permanently secured to an associated aperture in the base plate and has free ends. A locking assembly removably couples the base plate-coupling assembly to a tree. A support assembly has a downwardly extending auxiliary plate positionable over the base plate with an opening there through. The opening has an enlarged lower portion positionable over the head of the bolt and an upper portion of a reduced size for positioning over the central portion of the bolt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 6:
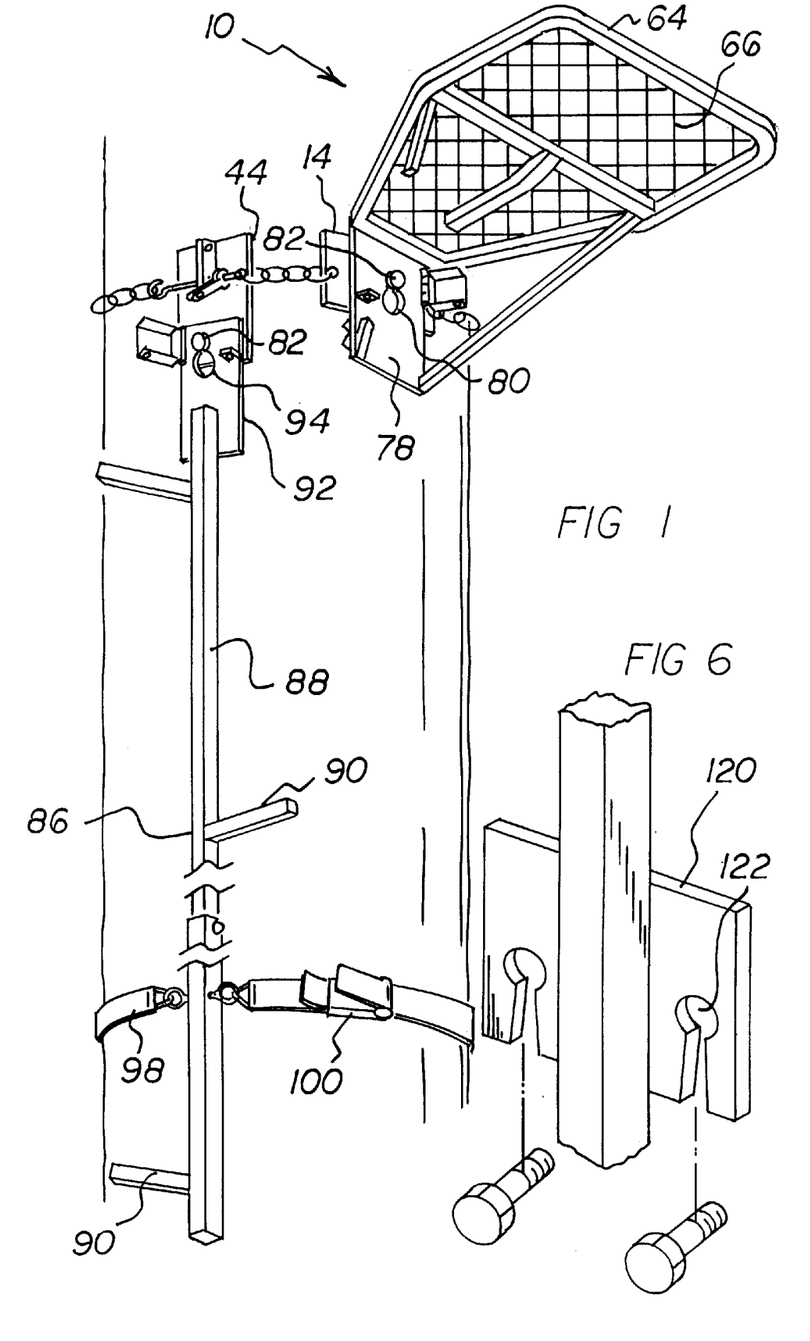
FIG. 1 is a perspective view of the preferred embodiment of the tree dech system for sportsmen when hunting at an elevated location in a tree without harming the supporting tree constructed in accordance with the principles of the present invention.
FIG. 6 illustrates an alternate embodiment of the coupling mechanisms.
Figure 2:
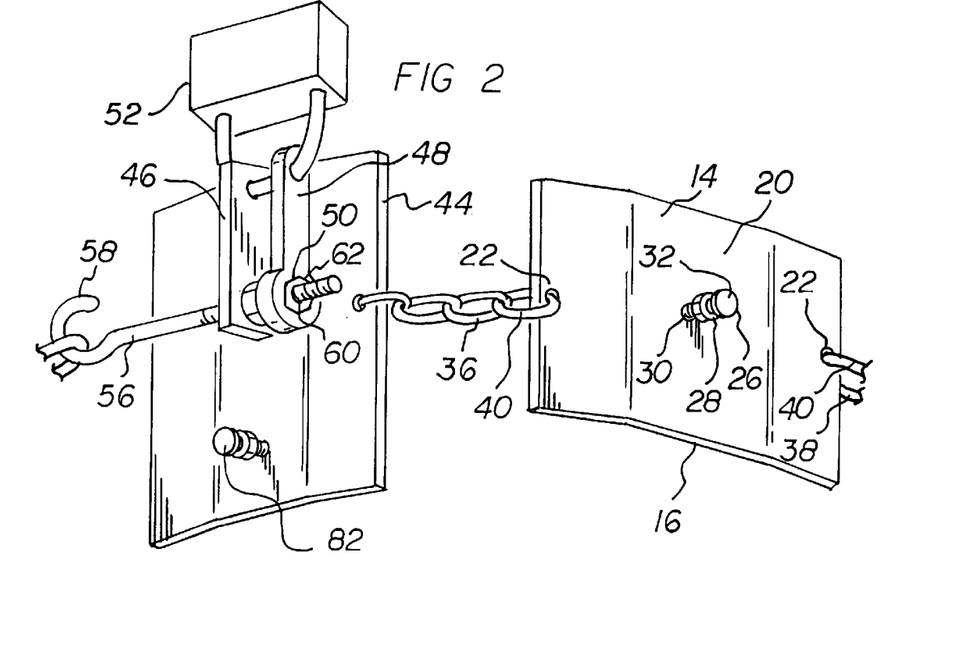
FIG. 2 is an enlarged perspective illustration of the upper support assembly.

With reference now to the drawings, and in particular to FIG. 1 thereof, the preferred embodiment of the new and improved system for sportsmen when hunting at an elevated location in a tree without harming the supporting tree embodying the principles and concepts of the present invention and generally designated by the reference numeral 10 will be described.

The present invention, the system for sportsmen when hunting at an elevated location in a tree without harming the supporting tree 10 is comprised of a plurality of components. Such components in their broadest context include a base plate, a cylindrical pin, a coupling assembly, a locking assembly and a support assembly. Such components are individually configured and correlated with respect to each other so as to attain the desired objective. The pine is preferably a threaded machine bolt ½ inch in diameter and 1¼ inches in length with a washer, nut and a small washer.

A base plate 14 is formed in a partially cylindrical configuration. The base plate has an interior face 16 adapted to be positioned in contact with the exterior surface of a supporting tree 18. The base plate has an exterior exposed face 20. The base plate also has laterally spaced apertures 22 adjacent to its side edges.

Next provided is a cylindrical bolt 26. The cylindrical bolt has a diameter over the majority of its central extent 28. The cylindrical bolt is preferably a ½ inch machine bolt with a washer, nut and small washer. The interior end 30 of the cylindrical pin is secured to the exterior surface of the base plate. The cylindrical bolt has an enlarged cylindrical exterior end 32.

A chain is formed of sections 36, 38. Each section has an interior link 40 permanently secured to an associated aperture in the base plate. The chain has couplable free ends.

A supplemental plate 44 is positioned on the exterior surface of the tree circumferentially remote from the base plate. The supplemental plate has an upper first locking component 46. The upper first locking component is provided with a hole there through. The supplemental plate also has an upper second locking component 48. The upper second locking component is provided with a second hole 50 there through. The first and second holes are alignable. A padlock 52 is secured through the holes during operation and use. The supplemental plate, base plate and chains are adapted to be removably secured to an elevated location on a tree. The ratcheting wrench with a hole in it is for the lock to go through. This wrench tightens and loosens the nut.

Next provided is a bolt 56 with a washer. The bolt has a C-shaped first end 58. The C-shaped first end of the bolt is removably attachable to a free end of a chain section. The bolt also has a threaded second end 60 which is removably couplable to a nut 62 in the second locking component.

A support assembly 64 has a horizontal floor 66. The floor is provided with an aperture 68. The aperture supports a transverse pivot bolt 70. Next provided is a seat 72 for a user. The aperture extends along the length of the support assembly and the seat. The seat has a leg 74. The upper end of the leg is secured to the bottom of the seat. A lower end of the leg is provided with an oval aperture 76. The oval aperture is pivotably received on the pivot pin. In this manner movement of the seat between a lowered orientation for storage and transportation and an upper orientation for operation and use by a seated hunter is effected. The seat has an auxiliary plate 78. The auxiliary plate is positionable over the base plate with an opening there through. The opening has an enlarged lower portion 80. The enlarged lower portion is positionable over the head of the bolt. An upper portion 82 is of a reduced size for positioning over the central portion of the bolt. This tree dech an seat of FIG. 5 are particularly adapted for state game lands where piercing of a tree as by a pin, screw or bolt, is prohibited.

Next provided is a ladder 86. The ladder is formed with at least one vertically extending bar 88. A plurality of horizontally extending climbing bars 90 extend outwardly from the vertically extending bar. An upper plate 92 is secured to the upper end of the vertically extending bar. An aperture is provided through the upper plate. The aperture has a lower circular portion 94. The lower circular portion is adapted to pass over the enlarged head 32 of the bolt 26. A reduced upper portion 82 of the aperture is adapted to be maintained on the central extent of the bolt.

Lastly provided is a supplemental ratchet strap 98. The strap is formed of two sections, preferably of nylon. The sections are secured at their interior ends to the lower portion of the vertical rod through eye bolts. The strap has free ends adapted to encompass the tree at a lower region. The free ends also function for removably coupling with lower locking components which may be similar to the upper locking components but are preferably in the form of a ratchet clamp 100. It should be understood that the ratchet strap arrangement could be used as a substitute for the chain assembly supporting the tree deck adjacent to the top of the ladder.

Figure 3:
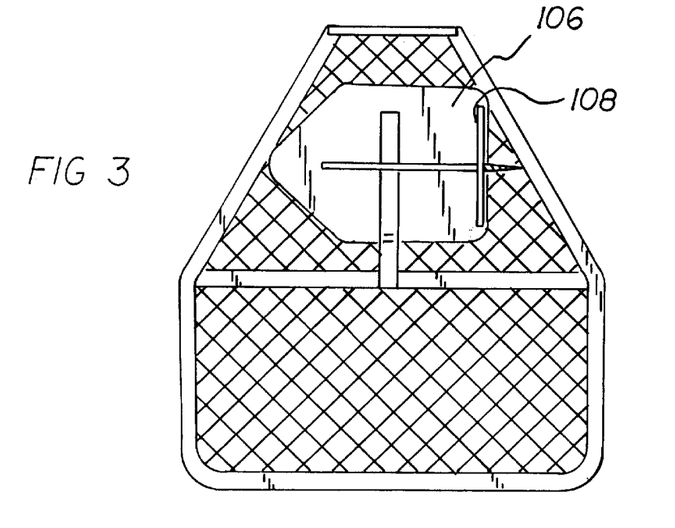
FIG. 3 is a bottom view of a dech with a portable screw-in seat which is slid in through the handle of the tree stand.
Figures 4, 5:
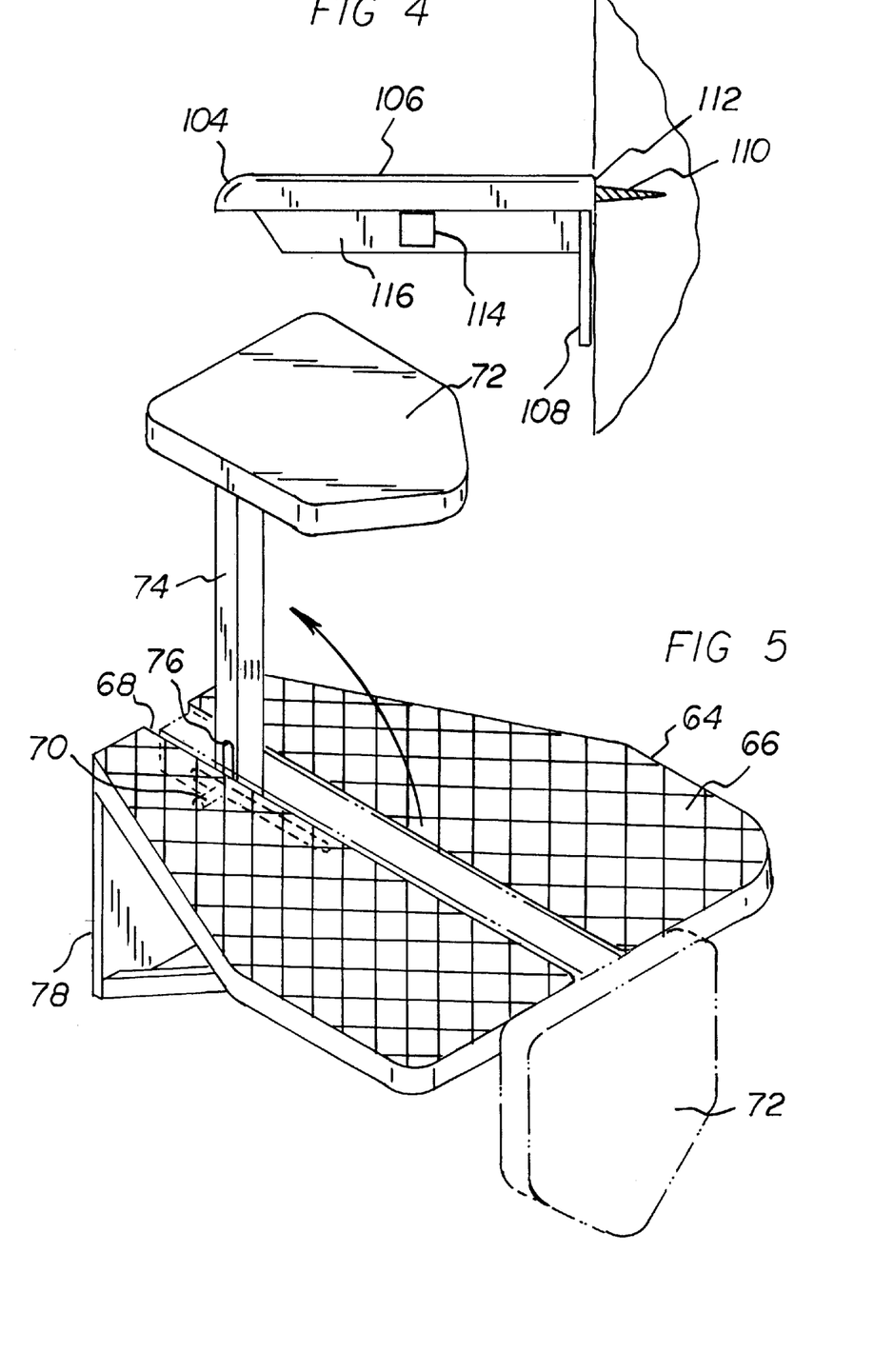
FIG. 4 is a side elevational view of the seat shown in FIG. 3.
FIG. 5 is a perspective view of a seat for use with a tree dech with the seat permanently coupled to the tree stand.

FIG. 4 illustrated a seat 104 having a horizontal support 106 for a hunter to sit upon while hunting. The seat also has an attached vertical plate 108 extending downwardly therefrom. A screw 110 extends through a vertical lip 112 of the support for penetrating into a tree to hold the seat in proper position during use. When not in use, the seat 104 may be coupled into a recess on the lower side of the deck of FIG. 3. The aperture 114 in the lower brace 116 beneath the horizontal support facilitates this removable positioning for storage. Such seat could be manufactured of metal or plastic or foam.

FIG. 6 illustrates a coupling plate 120 with keyhole opening 122, open at their bottoms, removably positionable on bolts extending outwardly from a tree. Plates 120 are preferably secured at an intermediate location along the length of the ladder and also at the top. This allows for ladder coupling at any of a plurality of heights of bolts on the tree. Such keyhole openings could be substituted for the essentially FIG. 8 openings of FIG. 1.

Figure 7:
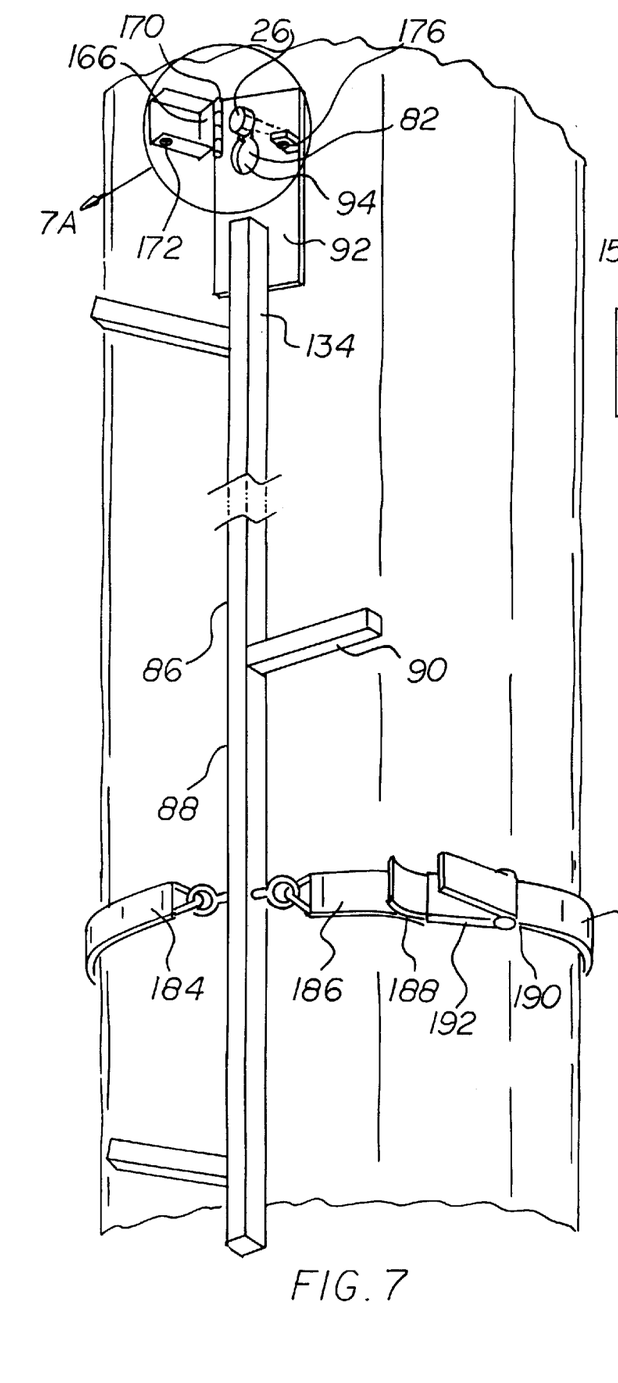
FIG. 7 is an enlarged perspective illustration of an alternate embodiment of the invention.
Figure 7A:
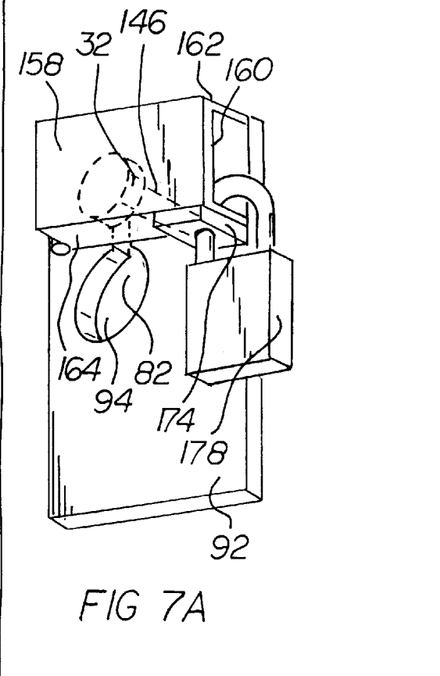
FIG. 7A is an enlarged perspective view of the locking mechanism in the locked orientation taken at circle 7A of FIG. 7.
Figure 8:
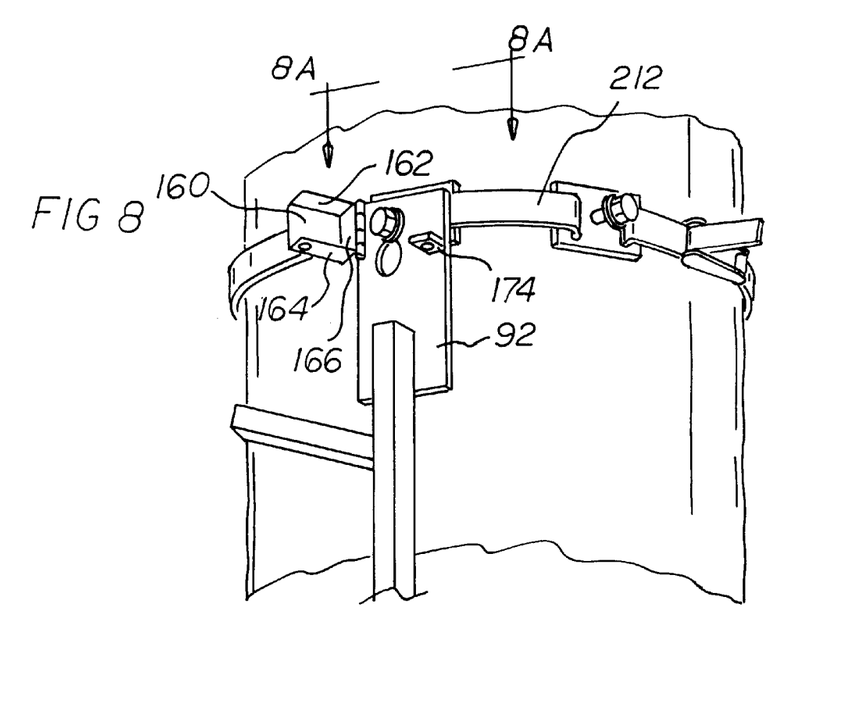
FIG. 8 is an enlarged perspective view similar to the top of that in FIG. 7 but illustrating an alternate technique for supporting the bolt.
Figure 8A:
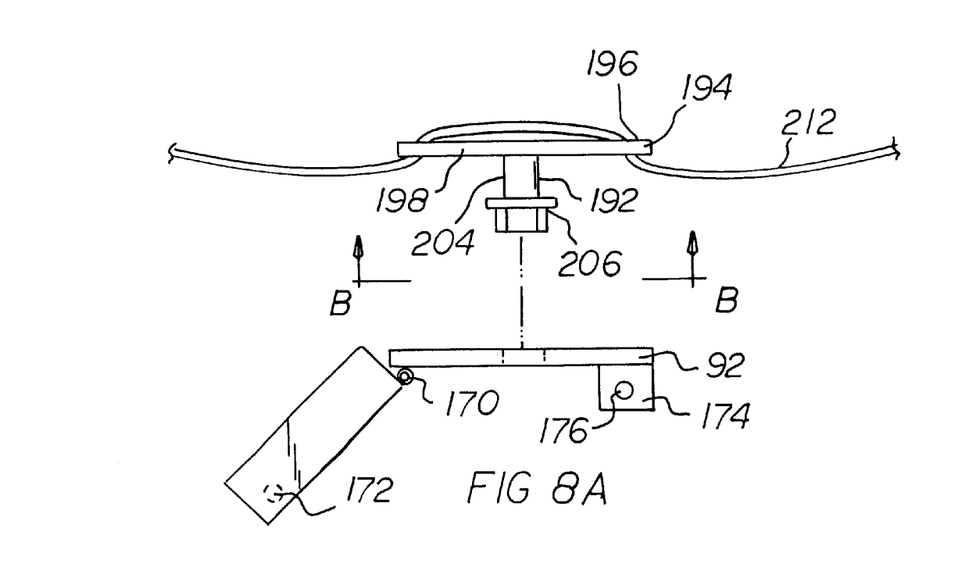
FIG. 8A is a top elevational view along line 8A—8A of FIG. 8.
Figure 8B:
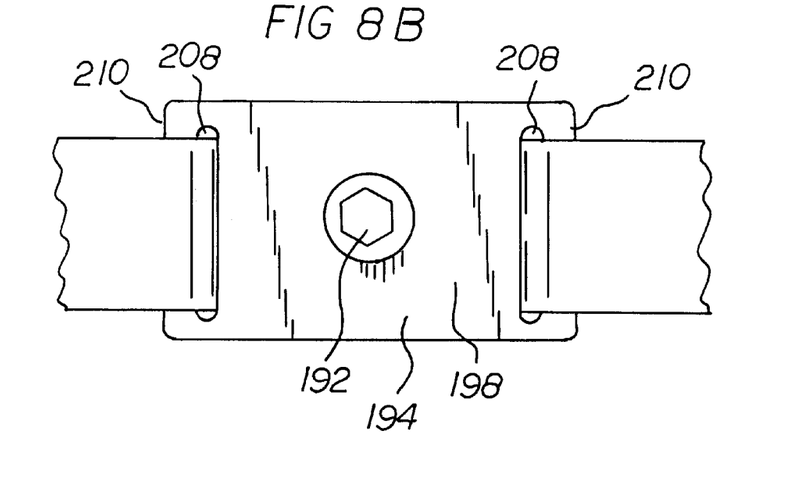
FIG. 8B is a front elevational view taken along line 8B—8B of FIG. 8A.
Figure 8C:
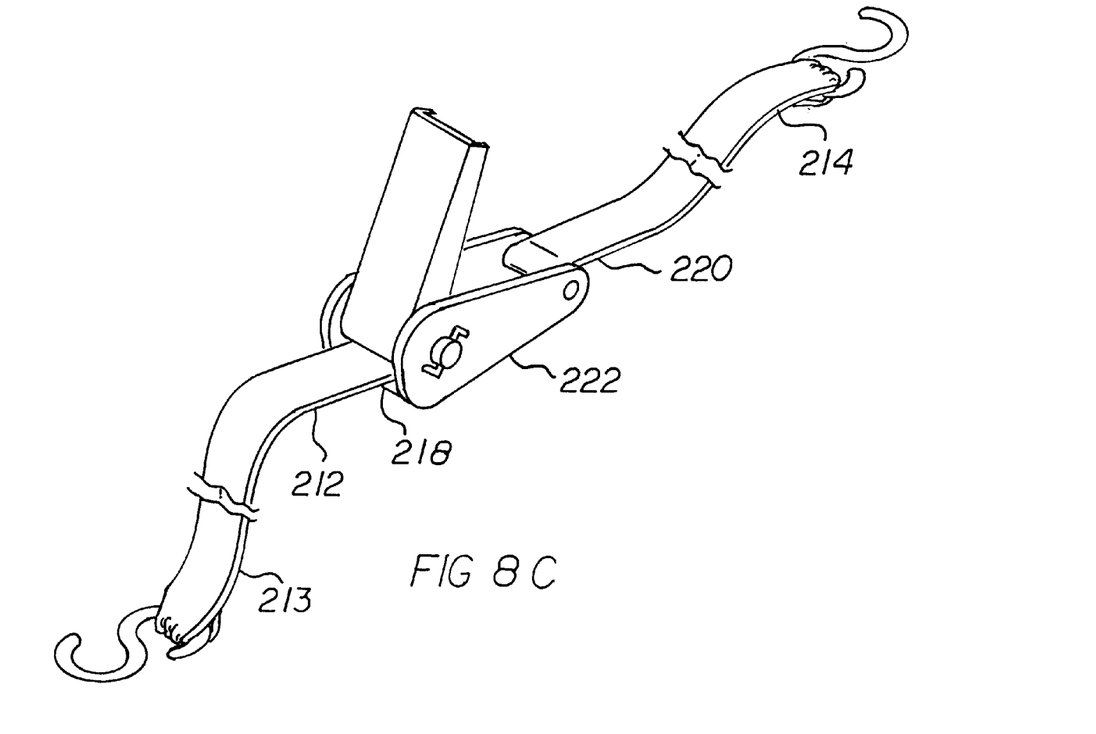
FIG. 8C is a perspective illustration of the strap shown at the bottom extent of FIG. 7.

An alternate embodiment of the invention can be seen in FIGS. 7 and 7A. In such embodiment, a ladder system 86 is adapted for use in association with deer hunting. The system comprises a vertically extending bar 88 having an upper end 134 and a lower end 136. The upper end is adapted to be secured with respect to a tree at an elevated orientation. The lower end is adapted to be oriented adjacent to the ground there beneath. Also provide on the vertically extending bar are a plurality of horizontally extending climbing bars 90. Such climbing bars extend in opposite directions from intermediate locations along the length of the vertically extending bar. They are adapted to be grasped by users and also stood upon by users when climbing the ladder to an elevated orientation with respect to the tree.

Another component of the system is a lag bolt 26. Such lag bolt is for securing into the tree. It is adapted to receive and support the vertically extending bar of the ladder. The lag bolt has a cylindrical enlarged head 32 and an intermediate cylindrical portion 146 of a lesser diameter.

Also part of the system is a rigid plate 92. Such rigid plate is secured to an upper end of the tree. It is also permanently secured to the upper end of the ladder which extends downwardly therefrom. The rigid plate has at least one primary aperture 82 formed there through with a lower enlarged opening 94 which is in communication with the primary aperture. The upper primary aperture is of a generally circular smaller size and has a diameter less than the diameter of the head of the lag bolt but of a diameter slightly greater than that of the intermediate portion of the lag bolt. The primary aperture is adapted to be received upon and supported by the reduced intermediate portion of the lag bolt for retention and securement purposes during operation and use.

A securement device 158 is formed in a boxlike configuration. Such device includes an enlarged vertical plate 160, smaller horizontal upper and lower plates 162, 164 and a smaller vertical end plate 166. In an open orientation as shown in FIG. 7, the primary aperture and bolt are exposed for coupling and uncoupling purposes. In FIG. 7A, the securement device is in a closed orientation wherein the primary aperture and bolt head are covered. A hinge 170 pivotally attaches the smaller vertical end plate in an orientation laterally offset from the bolt head and primary aperture. The hinge is adapted to hold the securement device. The lower plate has an aperture 172 there through with an associated fixed plate 174 with an aligned aperture 176 there through. The apertures are in a horizontally aligned orientation. In this manner, the securement device may be hingedly rotated from an unlocked orientation of FIG. 7 to expose at least the primary aperture and a closed orientation of FIG. 7A to cover the bolt head. A padlock 178 is for releasable securement through the apertures when in the closed orientation to preclude misappropriation of the ladder.

The system further includes a lower strap 182. Such lower strap has free ends 184, 186 which are removably couplable adjacent to the bottom of the vertically extending bar for securement purposes. The lower strap has intermediate ends 188, 190 with a winch 192 for tightening purposes.

A further embodiment is shown in FIGS. 8, 8A, 8B and 8C. Such embodiment is similar to that of FIGS. 7 and 7A. In such further embodiment, however, the lag bolt extending into the tree id eliminated in favor of a machine bolt in those environments such as state game preserves where trees may not be pierced. In replacing the lag bolt, a machine bolt 192 is utilized. Support for the machine bolt is through a support base 194 formed with an interior face 196 positionable against a tree at an elevated location. The support base also has an exterior face 198 with the machine bolt extending outwardly therefrom. The machine bolt has a cylindrical interior section 204 and an exterior section 206 of an enlarged diameter. The support base also has vertical slots 208 adjacent to its lateral edges 210. An upper strap 212 is provided with free ends 213, 214 coupling the support base to the tree at an elevated location for support purposes. The upper strap also has intermediate ends 218, 220 and a winch 222 there between for tightening purposes. An intermediate extent of the upper strap is threaded through the slots to secure the support base and machine bolt to a tree for receipt of the rigid plate. A rigid plate is removably secured to the upper end of the tree with a ladder which extends downwardly therefrom as in the prior embodiment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for sportsmen when hunting at an elevated location in a tree without harming the supporting tree comprising, in combination:

a base plate formed in a partially cylindrical configuration having an interior face adapted to be positionable in contact with the exterior surface of a supporting tree and having an exterior exposed face, the base plate having laterally spaced apertures adjacent to its side edges;

a threaded machine bolt having a diameter over the majority of its central extent with an interior end secured to the exterior surface of the base plate and having an enlarged cylindrical exterior end;

a chain formed of sections each section having an interior link permanently secured to an associated aperture in the base plate and having couplable free ends;

a supplemental plate positionable on the exterior surface of the tree circumferentially remote from the base plate with an upper first locking component having a hole there through and an upper second locking component with a second hole there through, the holes being alignable and having a padlock secured there through during operation and use, the supplemental plate, base plate and chains adapted to be removably secured to an elevated location on a tree;

a bolt having a C-shaped first end removably attachable to a free end of a chain section and a threaded second end coupleable to a nut in the second locking component;

a support assembly having a horizontal floor with an aperture supporting a transverse pivot bolt and extending along the length thereof and a seat for a user, the seat having a leg with an upper end secured to the bottom of the seat and a lower end with an oval aperture pivotably received on the pivot bolt for movement of the seat between a lowered orientation for storage and transportation and an upper orientation for operation and use by a seated hunter, the seat having a downwardly auxiliary plate positionable over the base plate with an opening there through, the opening having an enlarged lower portion positionable over the enlarged cylindrical exterior end of the machine bolt and an upper portion of a reduced size for positioning over the central portion of the machine bolt;

a ladder formed with at least one vertically extending bar with a plurality of horizontally extending climbing bars extending outwardly therefrom and with an upper plate secured to the upper end thereof with an aperture there through, the aperture having a lower circular portion adapted to pass over the head of a second machine bolt on said supplemental plate and a reduced upper portion to be maintained on the central extent of the second machine bolt; and a supplemental ratchet strap is formed of two sections secured at their interior ends to the lower portion of the vertically extending bar, the strap having free ends adapted to encompass the tree at a lower region thereof and for being removably coupled with lower locking components in the nature of a ratchet clamp.

2. A system for sportsmen when hunting at an elevated location comprising:

a base plate having an interior face positionable in contact with the exterior surface of a supporting tree and having an exterior exposed face, the base plate having laterally spaced apertures adjacent to its edges;

a threaded machine bolt having a diameter over the majority of its length having an interior edge secured to the exterior face of the base plate and having an enlarged cylindrical exterior end;

a coupling assembly formed of two sections each section having an interior link permanently secured to an associated aperture in the base plate and having free ends;

a locking assembly for removably coupling the base plate and coupling assembly to a tree;

a support assembly having a downwardly extending auxiliary plate positionable over the base plate with an opening there through, the opening having an enlarged lower portion positionable over enlarged cylindrical exterior end of the machine bolt and an upper portion of a reduced size for positioning over the central portion of the bolt, and further including a supplemental plate coupled to said coupling assembly and said locking assembly, the supplemental plate having a generally cylindrical member with an enlarged head extending therefrom and a ladder formed with at least one vertically extending bar with a plurality of horizontally extending climbing bars extending outwardly therefrom and with an upper plate secured to the upper end thereof with an opening there through, the opening having a lower portion adapted to pass over the enlarged head of the generally cylindrical member on said supplemental plate and a reduced upper portion to be maintained on the central extent of the generally cylindrical member.

3. The system as set forth in claim 2 wherein the support assembly includes a horizontal floor with an aperture supporting a transverse pivot bolt and extending across the length thereof and a seat for a user, the seat having a leg with an upper end secured to the bottom of the seat and a lower end with an oval aperture pivotably received on the pivot bolt for movement of the seat between a lowered orientation for storage and transportation and an upper orientation for operation and use by a seated hunter.

4. The system as set forth in claim 2 wherein the laddr further comprising a coupling plate with laterally displaced openings therein for receiving two outwardly extending pins secured to the tree.

5. A new and improved ladder system for use in association with deer hunting comprising, in combination:

a vertically extending bar having an upper end and a lower end, the upper end adapted to be secured with respect to a tree at an elevated orientation and the lower end adapted to be oriented adjacent to the ground there beneath;

a plurality of horizontally extending climbing bars extending in opposite directions from intermediate locations along the length of the vertically extending bar in a plane parallel with the vertically extending bar and adapted to be grasped by users and stood upon by users when climbing the ladder to an elevated orientation with respect to the tree;

a lag bolt adapted to be secured with respect to a tree and adapted to receive and removably support the upper end of the vertically extending bar, the lag bolt having an enlarged lead and an intermediate portion of a lesser diameter; and a rigid plate secured to the upper end of the vertically extending bar and extending upwardly therefrom, the plate being in a common vertical plane with the vertically extending bar and having at least one aperture formed with a lower enlarged portion and, in communication therewith, a generally circular smaller section with a diameter less than the diameter of the head of the lag bolt but of a diameter greater than the of the intermediate portion of the lag bolt adapted to be received upon the reduced intermediate portion of the lag bolt for securement purposes.

6. The system as set forth in claim 5 and further including:

a securement device formed in a boxlike configuration such device including an enlarged vertical plate, smaller horizontal upper and lower plates and a smaller vertical end plate and in an open orientation to expose the aperture and bolt and in a closed orientation covering the aperture and bolt with a hinge pivotally attaching the smaller vertical end plate laterally offset from the smaller section of the aperture, rotatably coupling the smaller vertical end plate to the rigid plate and, the hinge adapted to hold the securement device, the lower plate having an aperture there through with an associated fixed plate with an aligned aperture there through in a horizontal orientation whereby the securement device may be hingedly rotated from an unlocked orientation to expose at least the circular smaller section and a closed orientation to cover at least the circular smaller section with a bolt therein; and a padlock for securement through the apertures when in the second orientation.

7. The system as set forth in claim 6 and further including a lower strap having free ends removably coupled to the bottom of the vertically extending bar for securement purposes, the lower strap having intermediate ends with a winch for tightening purposes.

8. A new and improved ladder system for use in association with deer hunting comprising, in combination:

a vertically extending bar having an upper end and a lower end, the upper end adapted to be secured with respect to a tree at an elevated orientation and the lower end adapted to be oriented adjacent to the ground there beneath;

a plurality of horizontally extending climbing bars extending in opposite directions from intermediate locations along the length of the vertically extending bar and adapted to be grasped by users and stood upon by users when climbing the ladder to an elevated orientation with respect to the tree;

a support base having an interior face postionable against a tree at an elevated location and also having an exterior face with a machine bolt extending outwardly therfrom, the machine bolt having a cylindrical interior section and an exterior section of an elarged diameter, the support base also having vertical slots adjacent to its lateral edges with an upper strap having free ends and an intermediate extent couplable to a tree at an elevated location for support purposes, and a winch coupled to the intermediate extent with the upper strap threaded through the winch for tightening purposes, the upper strap being threaded through the slots to secure the support base and machine bolt to a tree for receipt of the rigid plate; and a rigid plate secured to the upper end of the tree and extending upwardly therefrom, the plate having at least one aperture formed with a lower enlarged portion and, in communication therewith, a generally circular smaller section with a diameter less than the diameter of the head of the machine bolt but of a diameter greater than the of the intermediate portion of the machine bolt adapted to be received upon the reduced intermediate portion of the machine bolt for securement purposes.

9. The system as set forth in claim 8 and further including:

a securement device formed in a boxlike configuration such device including an enlarged vertical plate, smaller horizontal upper and lower plates and a smaller vertical end plate and in an open orientation to expose the aperture and bolt and in a closed orientation covering the aperture and bolt with a hinge pivotally attaching the smaller vertical end plate laterally offset from the smaller section of the aperture, the hinge adapted to hold the securement device, the lower plate having an aperture there through with an associated fixed plate with an aligned aperture there through in a horizontal orientation whereby the securement device may be hingedly rotated from an unlocked orientation to expose at least the top hole and a closed orientation to cover at least the top hole with a bolt therein; and a padlock for securement through the apertures when in the second orientation.

10. The system as set forth in claim 9 and further including a lower strap having free ends removably coupled to the bottom of the vertically extending bar for securement purposes, the lower strap having intermediate ends with a winch for tightening purposes.

* * * * *